July 23, 1957
R. M. ULRICH
2,800,343
SEPARABLE COUPLING
Filed March 29, 1955
2 Sheets-Sheet 1
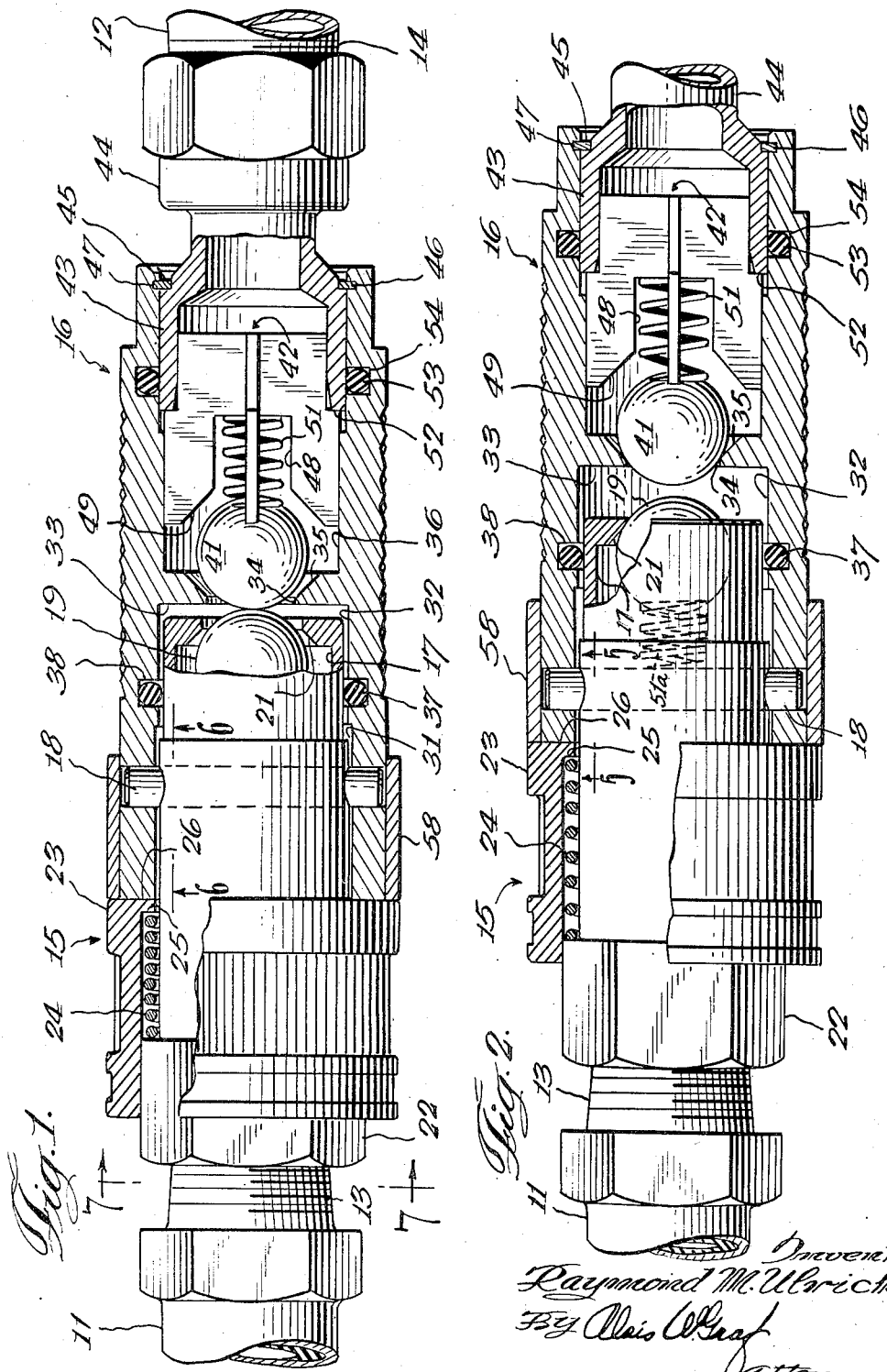
Inventor
Raymond M. Ulrich
By Alois W. Graf
Attorney July 23, 1957 R. M. ULRICH 2,800,343
SEPARABLE COUPLING
Filed March 29, 1955 2 Sheets-Sheet 2
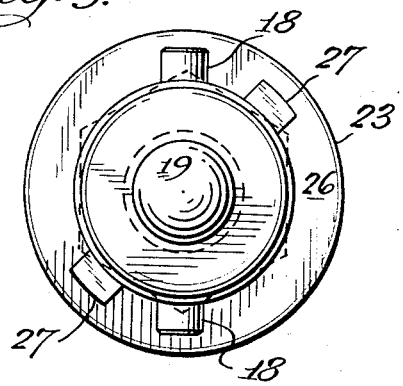
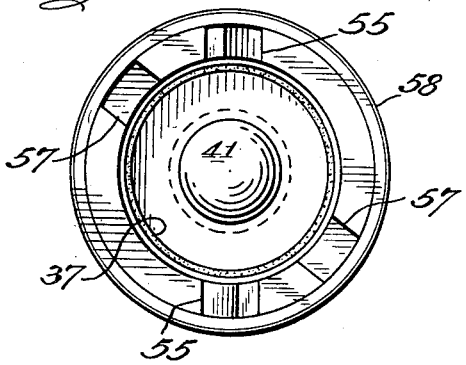
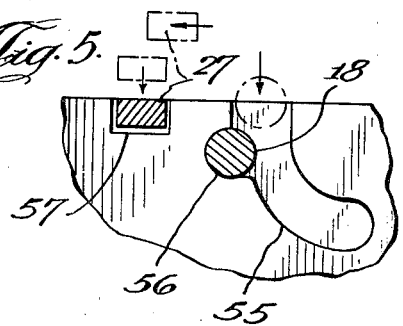
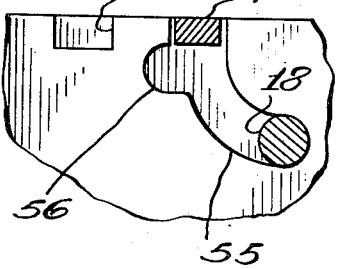
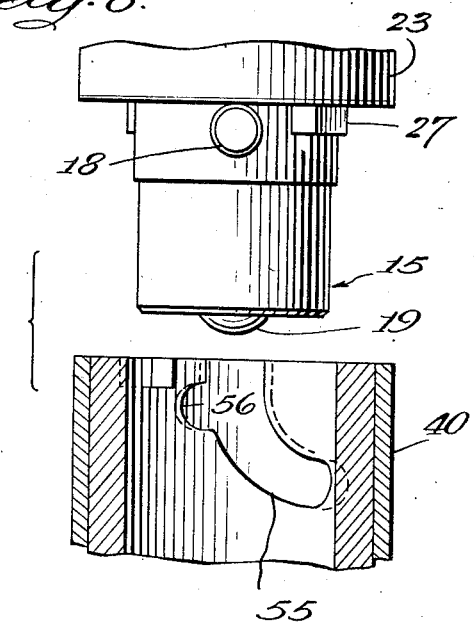
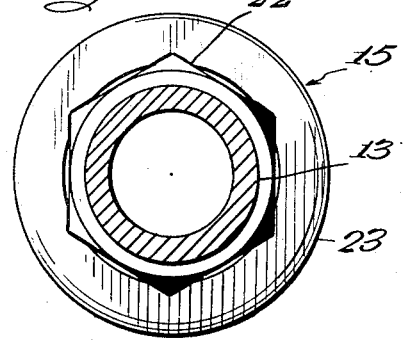
Inventor
Raymond M. Ulrich
By Alois W. Graf
Attorney United States Patent Office
2,800,343
Patented July 23, 1957

2,800,343

SEPARABLE COUPLING

Raymond M. Ulrich, Roanoke, Ill., assignor to Ulrich Foundation, Inc., Roanoke, Ill., a corporation of Delaware Application March 29, 1955, Serial No. 497,658

3 Claims. (Cl. 284—18)

This invention relates to a separable coupling device, and more particularly to a self-sealing coupling for hydraulic conduits.

In agricultural and industrial machinery there frequently is need for a separable coupling which will seal each of the conduits when uncoupled. It has been found that in the class of such couplings which are quickly disconnectable, the disconnected coupling ends may be physically damaged by striking a hard surface. Such damage may also result when, after being disconnected, the coupling ends hang down, and in moving the machinery the couplings become entangled or strike against fixed objects.

Another problem is that dust and dirt find ready access into the disconnected coupling ends which tends to be suspended in the fluid transmitted through the conduits upon re-connection of the coupling ends. The present invention overcomes these disadvantages by providing an intermediate position for the coupling in which the conduit fluid passages are sealed from one another without completely separating the coupling members. Thus, the intermediate position operates to maintain the physical unity and dust-proof integrity of the coupling ends.

Accordingly, it is an object of this invention to provide a new and improved self-sealing separable coupling for hydraulic conduits.

Another object of this invention is to provide an improved separable coupling having an intermediate coupling position in which the conduit fluid passages are sealed from one another without completely separating the coupling members.

Another object of this invention is to provide an improved separable coupling device in which the separable coupling ends are less likely to be damaged and will pick up a minimum amount of dust and dirt.

Other objects and advantages of the invention will be apparent during the course of the following description when read in connection with the accompanying drawings, wherein:

Figure 1 shows a coupling in cross-section connected together and embodying the principles of the present invention;

Figure 2 shows the coupling of Figure 1 in its intermediate position wherein the fluid passages are sealed from one another, but the coupling members are still physically connected;

Figure 3 is a valve end view of the male member of the coupling device;

Figure 4 is a valve end view of the female member of the coupling device;

Figure 5 is a developed view of the male member engaging the female member in its intermediate coupling position taken at 5—5 of Figure 2;

Figure 6 is a developed view of the male member engaging the female membr of the coupling device in its connected position taken at 6—6 of Figure 1;

Figure 7 is a sectional view of the male member of the coupling taken at 7—7 of Figure 1; and Figure 8 is a side elevation view of the male member of the coupling device above and in position to engage the female member of the coupling shown in cross-section.

In the description to follow, reference will be had throughout for details not pertinent to the novel features of the typical embodiment disclosing the invention to two co-pending applications of the inventor, namely Serial No. 259,913, filed December 5, 1951, now abandoned (reference A), and Serial No. 405,441, filed January 21, 1954 (reference B) patented August 7, 1956, No. 2,757,684.

Referring to the drawing it will be seen that there has been illustrated a separable coupling interconnecting two hydraulic conduits 11 and 12 which are provided with respective threaded members 13 and 14. It will be assumed that the conduit 11 is connected to a machine or device which is apt to carry a load, and that the two conduits are to be separated without the removal of the load, and hence the fluid in the conduit 11 is under appreciable hydraulic pressure. The conduit 12 extends to a power source of hydraulic fluid, and hence when this is shut off the fluid in the conduit 12 is under comparatively low pressure.

The improved coupling comprises a male member 15 and a female member 16. The male member 15 has an axial bore 17, within which is positioned a guide and stop member (not shown), details of which are shown in reference (A). The male member 15 carries a pin 18 which projects beyond the outside of the member 15 so that the pin ends may engage diametrically arranged slots in the female member. Located within the axial bore 17 is a closure ball 19 which is biased towards its seat 21 by a spring 51a which abuts the pin 18, as shown in dotted lines. When the two portions of the coupling are connected together, the closure ball 19 is held a predetermined distance from the valve seat 21 in axial alignment with the bore 17.

The male member 15 terminates in a hexagonal nut 22, whose centrally located aperture receives the threaded member 13 of the hydraulic conduit 11. A sleeve 23 is slidably positioned on the male member 15 and is constrained to move along a portion thereof. The sleeve 23 is biased toward the pin-like projections 18 by a spring 24. The spring 24 is positioned in compression between a shoulder formed by the hexagonal nut 22 and an inner surface 25 of a transverse wall 26 of the sleeve 23. The sleeve 23 has extending from its transverse wall 26 two key projections 27 (see Figure 3).

The male member 15 fits into an enlarged bore 31 of the female member 16. The enlarged bore 31 is extended further into the female member by a bore portion 32 which terminates in a transverse wall section 33. The transverse wall section 33 has a centrally located aperture 34. A valve seat 35 surrounds the aperture 34 in the wall 33 facing toward a bore section 36 extending through the female member 16 on the side of the transverse wall 33 opposite to the bore section 32.

An O-ring 37 is positioned in a recess 38 at an intermediate point in the bore section 32, and provides a pressure type seal between the female and male members of the hydraulic coupling.

A closure ball 41 faces the valve seat 35 and is supported by an elongated X-shaped element 42. The elongated X-shaped element 42 is disposed between the end portion 43 of the hose coupler 44 and the closure ball 41. The swivel hose coupler 44 terminates in a hexagonal nut, similar to hexagonal nut 22, into which is screwed the conduit 12 by means of threaded member 14. The end portion 43 of the hose coupler 44 is provided with a recess 45 which abuts the retaining band 46. When the hose coupler 44 is a maximum distance from the valve seat 35, the combined depth of a mating recess 47 in the coupling member 16 adjacent to the open end of the passage section 36 and the groove 45 is barely sufficient to permit insertion of the retaining band 46.

The element 42 is formed by two slotted plates disposed at right angles to each other. The X-shaped element 42 is provided with an axial recess 48 confronting the closure ball 41, the plates forming element 42 being tapered to provide the recess 48 with an outwardly flaring mouth 49. A helical spring 51 is disposed within the recess 48 along the axis of the passage 36 abutting the X-shaped element 42 and the closure ball 41. The element 42 is provided with shoulders 52 which are disposed at the point where the X-shaped element 42 achieves a diameter just smaller than that of the passage 36. The end portion 43 of the hose coupler 44 abuts these shoulders 52. A sealing ring 53 is disposed within a channel 54 in the passage 36 adjacent to the end portion 43 of the house coupler 44 and prevents leakage of fluid from the passage 36 between the female member 16 and the swivel end portion 43 of the hose coupler 44. For further details of the X-shaped member 42 and its associated structure, reference is had to reference (B) cited above.

The bore portion 31 of the female member 16 has two bayonet slots 55 (see Figures 5, 6 and 8) diametrically arranged to engage the pin-like projections 18 of the male member 15. Each of the slots 55 has a cylindrical recess 56 along its path. The female member 16 has two key-shaped slots 57 diametrically arranged to engage the key projections 27 of the male member 15 when the pin-like projections 18 of the male member 15 are positioned in the cylindrical recesses 56 along the female member slots 55. This will hereafter be referred to as the intermediate position of the coupling. The key projections 27 of the male member 15 engage the beginning of the female member slots 55 as the pin-like projections 18 engage the end of these slots. In this latter position the spring loaded closure balls 19 and 41 are engaged to connect together the respective passages in the hydraulic conduit through the hydraulic coupling members.

The slots 55—57 of the female member 16 are covered by a sleeve 58 which in conjunction with the sleeve 23 of the male member 15 provides a continuous dust-protecting covering for the coupling ends in both the intermediate and connected positions of the coupling. It should, of course, be understood that the need for sleeve 58 may be avoided by maintaining intact the peripheral wall portion of the female member 16. This can be done, for example, by limiting the depth of slots 55—57.

Referring now to Figures 3 to 6 and 8 for a step by step operation of the coupling, Figure 8 shows the male member positioned above the female member of the coupling just prior to engagement of the two coupling members. Figures 3 and 5 show the two coupling members as they are engaged into the intermediate coupling position. This is accomplished by lowering the pin-like projections 18 until they are positioned in the beginning of the bayonet passages 55. The sleeve 23 is now pulled backward toward the conduit 11, and with a slight turning action the pin-like projections 18 engage the cylindrical recesses 56. At the same time the key projections 27 are lodged in the key-shaped slots 57 by the sleeve 23 which is forced forward by spring 24 into abutment with the sleeve 58 of the female member 16. In this intermediate position the closure balls 19 and 41 do not contact each other, but remain seated in their respective seats 21 and 35. Thus, this intermediate position provides a dust-proof, decoupled position for the hydraulic coupling members 15 and 16.

If it is now desired to engage the coupling members so as to connect together the hydraulic passages of the respective members, the sleeve 23 is again pulled back towards the conduit passage 11. This will withdraw the key projections 27 from the key-shaped slots 57. The male and female coupling members are now turned with respect to each other until the pin-like projections 18 are seated at the very end of the bayonet slots 55. The sleeve 23 is now released so as to cause the key projections 27 to engage the beginning of the bayonet slots 55. This will again provide a dust-proof cover for the hydraulic coupling members. The spring loaded closure balls 19 and 41 are now engaged, providing a second position in which the hydraulic passages of these members are connected together. This second position is clearly illustrated in Figures 4 and 6.

Figure 7 shows the end of the sleeve as it slides on the hexagonal nut 22.

While there has been shown and described an invention in connection with certain specific embodiments, it will, of course, be understood that it is not intended nor wished to be limited thereto since it is apparent that the principles herein disclosed are susceptible of numerous other applications, and modifications may be made in the structural arrangement and in the instrumentalities employed without departing from the spirit and scope of this invention as set forth in the appended claims.

I claim as my invention:

1. A separable coupling for hydraulic conduits having male and female members each provided with a bore terminating in a valve seat and a spring-loaded ball closure for each seat comprising in combination a pair of radial projections on said male member, a sleeve on said male member arranged to move longitudinally along a portion thereof, said sleeve being spring biased to abut against said first pair of radial projections, a second pair of longitudinal projections on said sleeve angularly spaced from said first pair of radial projections, said female member having a pair of bayonet slots arranged to engage said pair of radial projections of said male member, said pair of bayonet slots each having a recess along its path, said female member having a second pair of slots diametrically arranged to engage said pair of longitudinal projections of said male member sleeve when said pair of radial projections of said male member are positioned in said recesses along said pair of female member bayonet slots, said pair of longitudinal projections of said male member sleeve engaging the upper end of said pair of female member bayonet slots as said pair of radial projections engage the lower end of said pair of bayonet slots, said spring-loaded ball closures being engaged by each other and unseated to connect the respective passages in said hydraulic conduits in said latter position of said hydraulic coupling members.

2. A two position separable coupling for hydraulic conduits having male and female members each provided with a bore terminating in a valve seat and a spring-loaded ball closure for each seat comprising in combination a radial projection on said male member, a sleeve on said male member arranged to move longitudinally along a portion thereof, said sleeve being spring biased to abut against said radial projection, a longtiudinal projection on the forward edge of said sleeve angularly spaced from said radial projection, said female member having a bayonet slot arranged to engage said radial projection of said male member, said bayonet slot having a recess along its path, said female member having a second longitudinal slot arranged to engage said longitudinal projection of said male member sleeve when said radial projection of said male member is positioned in said recess along said female member bayonet slot to provide an intermediate coupling position, said longitudinal projection of said male member engaging the upper end of said female member bayonet slot as said radial projection engages the lower end of said bayonet slot, said spring-loaded ball closures being engaged and unseated by each other to connect the respective passages in said hydraulic conduits in said latter complete coupling position of said hydraulic coupling members.

3. A separable coupling according to claim 2 having a fixed sleeve covering said female member slots so as to form in conjunction with said movable sleeve covering said male member a dust-proof covering for said coupling in both the intermediate and the coupled positions of said coupling.

References Cited in the file of this patent

UNITED STATES PATENTS

| | | |
|---|---|---|
| 1,901,973 | Macey | Mar. 21, 1933 |

FOREIGN PATENTS

| | | |
|---|---|---|
| 508,311 | Germany | Sept. 27, 1930 |
| 425,141 | Great Britain | Mar. 7, 1935 |
| 853,994 | Germany | Oct. 30, 1952 |

OTHER REFERENCES

Ulrix Advertisement, received in Div. 52, April 9, 1951.